May 3, 1949. M. CHERNEY 2,468,812
DIGIT INDICATOR FOR SLIDE RULES
Filed Nov. 27, 1946
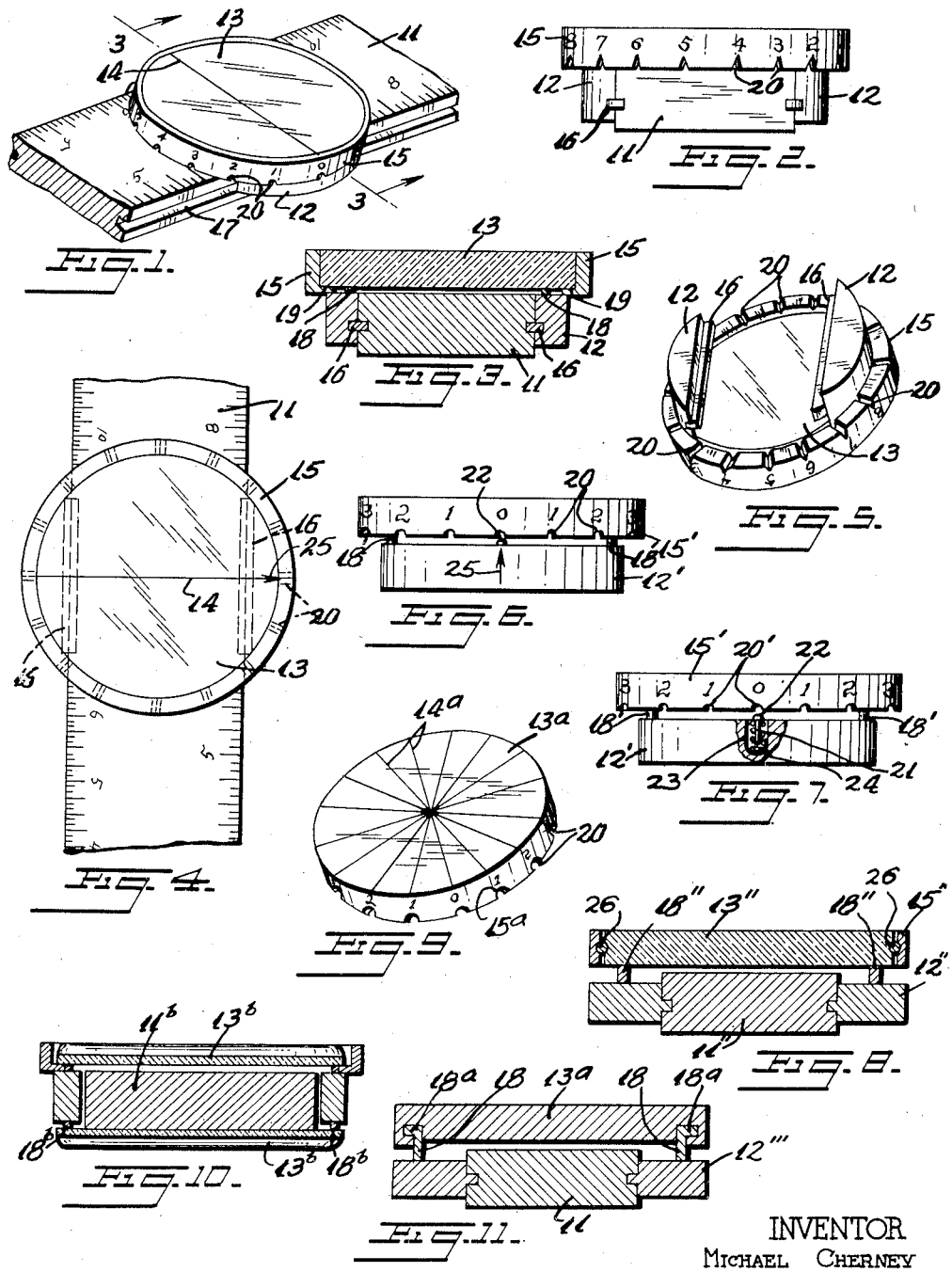
INVENTOR
MICHAEL CHERNEY
BY
ATTORNEY Patented May 3, 1949

2,468,812

UNITED STATES PATENT OFFICE 2,468,812

DIGIT INDICATOR FOR SLIDE RULES

Michael Cherney, North Tarrytown, N. Y., assignor of one-half to Joseph B. Danis, New City, N. Y.

Application November 27, 1946, Serial No. 712,621

8 Claims. (Cl. 235—64.3)

This invention relates in general to an attachment for a slide rule and in particular to a digit counter or digit indicator for a slide rule.

In the conventional use of the slide rule which obviously need not be explained herein, it is relatively simple to obtain significant figures for most arithmetic calculations. However, it is frequently difficult to correctly place the decimal point in the answer. Accordingly, it is an object of this invention to provide a simple and convenient means for counting the digit in slide rule calculations.

It is a further object of this invention to provide a slide rule attachment adapted to be conventionally placed around the indicator or hair line of the conventional slide rule glass.

It is an additional object of this invention to provide a digit indicator comprising in general a ring adapted to encircle the reading glass on a slide rule and having a series of numbers arranged around its periphery to indicate the position of the decimal point in the answer.

Further objects of this invention as well as its construction, use and operation will in part be obvious and will in part become apparent from the following description.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a section of a slide rule having thereon a digit indicator according to one form of this invention.

Fig. 2 is an end elevation of the article shown in Fig. 1.

Fig. 3 is an end cross section of the article shown in Fig. 1 taken along the line 3—3.

Fig. 4 is a top plan view of the article shown in Fig. 1.

Fig. 5 is a bottom perspective view of a slider and digit indicator according to one form of this invention.

Fig. 6 is a side elevation of a slide and digit indicator according to another form of this invention.

Fig. 7 is a similar view partially in section of the article shown in Fig. 6.

Fig. 8 is an end cross section similar to Fig. 3, illustrating another embodiment of this invention.

Fig. 9 is a top perspective view of a digit indicator according to a still further form of the invention.

Fig. 10 is an end cross section similar to Fig. 3 illustrating the mounting of a digit indicator according to still another form of the invention on a duplex type slide rule.

Fig. 11 is a similar view to Fig. 3, showing another form of the invention.

Referring to the figures in detail there is shown in Fig. 1 a slide rule generally designated 11 having mounted thereon a sliding attachment 12 which in turn mounts a glass 13 having a hair line 14 and having a digit indicator 15 according to this invention positioned therearound.

The slide rule 11 may be any of numerous conventional slide rules and accordingly it is shown simply in outline without an illustration of the sliding members thereon. A complex showing of the slide rule is avoided inasmuch as an illustration of a slide rule and its operation would serve only to cloud the true nature of the invention in a maze of unnecessary drawings. It is understood, for example, that the adjustments hereinbefore to be described may be applied to any conventional slide rule, and if necessary obvious alteration in the structure of the attachment may be made to allow for variations in the structure of the slide rule itself.

The glass 13 mounted on this slide rule is a conventional slide rule indicating glass having a hair line 14 thereacross, and preferably the glass is substantially circular in shape. Positioned around the glass 13 is a digit indication 15 comprising a ring having a series of numbers on its surface. In the preferred form of this invention these numbers are cut into the surface or otherwise imbedded therein and are painted preferably in two colors, for example, red or black. The numbers are positioned to read consecutively in each direction from a centrally zero to a top figure, for example, the figure 8. Thus, for example, starting with the central figure zero, it is possible to read toward the right figure from 0 to 8 in red letters and toward the left figure from 0 to 8 in black letters.

The digit indicator is slidably mounted around the glass 13 so that the indicator may be turned to bring any desired number in line with the hair line 14. In the position shown in Fig. 1, the number 0 is thus lined up, and accordingly a "0" position on the indicator is illustrated.

In the further figures shown herein are illustrated details of construction and operation according to various forms of the invention.

In Fig. 2 there is shown an end view of the slide rule 11 having a slider 12 mounted thereon, for example, by means of a metallic strip 16 on either side which engages the slider 12 and the slide rule 11. Preferably this strip 16 is integrally mounted within the slider 12 and is adapted to slide along a groove 17 in the slide rule (refer to Fig. 1). While it is understood that these metallic strips 16 may be replaced by strips of various other materials, nevertheless according to the present preferable form of the invention a metal is used herein because of its relatively low and regular coefficient of friction.

Mounted on this slide 12 by conventional means such as, for example, mounting posts 18 is a slide rule glass 13 as previously described (refer to Fig. 3). As shown in Fig. 3 there is optionally a slight space between the slider 12 and the glass 13, the purpose of which will hereinafter become obvious.

The digit indicator 15 shown in Figs. 2 and 3 comprises essentially a ring having a flange 19 along its inner lower surface which is adapted to extend below the glass 13 and preferably between the glass and the slider 12, into the space therebetween as previously referred to, thus securing the indicator 15 securely upon the glass. Along the lower edge of the indicator 15 and positioned below each of the numerals are a series of grooves or notches 20. These grooves or notches serve to provide the operator with means apparent to the sense of touch for determining the location of the various numerals around the edge of the digit indicator, or as shown in Figs. 6 and 7 hereinafter to coact with a positive engaging means.

Referring to Figs. 1 and 4 it is seen that the digit indicator is adapted to be turned with respect to the glass 13 so as to bring any of the numerals along its edge in line with hair line 14.

In Fig. 4 there is shown a top view of the attachment positioned on slide rule illustrating the position of and the space between the various notches 20 and accordingly between the numbers whereby the digit indicator is suitable for use with a relatively inexact sense of touch. Further there is shown in this figure an extent to which a digit indicator extends beyond the side of slide rule 11 thereby providing relative wide surfaces for grasping the indicator for sliding or other manipulations thereof.

In Fig. 5 there is shown the bottom view of the slider and the digit indicator to illustrate more clearly the structure thereof. As shown in this figure, the digit indicator 15 is rotatably mounted on the slider 12 and metallic strips 16 which likewise are mounted on the slider are adapted to slidably bear on the slide rule 11, the position of the notches 20 likewise as shown in connection with each of the numerals around the edge of the digit indicator.

In Figs. 6 and 7 there is shown a somewhat different form of the invention having here again the digit indicator 15' rotatably mounted on a slider 12', for example, by means of a glass (not shown in these figures) which is mounted on the slider by means of supports or mounting posts 18'. As shown in these figures, the digit indicator terminates directly over and only slightly above an upper surface of the slider 12'. A pawl, for example, comprising a post 21 having a knob 22 at its upper end, is mounted in well 23 in the slider 12' and is urged to project therefrom by means of a spring 24 which surrounds the post and bears against the bottom of the well. The knob 22 on the upper end of this pawl is thus adapted to be projected into one of the notches 20' on the lower edge of the indicator 15'. By this means the indicator is releasably retained in one of a series of positions in each of which positions one of the numbers is lined up with the hair line 14' or alternatively with an arrow 25 on the slider 12'.

According to this form of the invention an accurate positioning of the digit indicator is made automatically possible, and further the operation of the indicator may be carried out solely by the sense of touch. Thus, for example, an operator using the slide rule can rotate the digit indicator a different and predetermined number of notches without looking at the indicator or hair line.

In Fig. 8 there is shown a somewhat different form of this invention in which slider 12'' is mounted on a slide rule 11'' as previously described and a glass 13'' is in turn mounted on this slider, for example, by means of mounting posts 18'' also as previously described. Slidably positioned around the glass 13'' is a digit indicator 15'' according to another of the previously described figures.

Around the edge of the glass 13'' is a shallow groove, and likewise around the inner surface of the digit indicator 15'' is a corresponding shallow groove which is adapted to face the groove on the glass. A relatively fine wire ring 26 is mounted in the groove around the edge of the glass 13'' and extends therefrom to project into the groove in the digit indicator 15''. The ring 26 may be formed in any suitable manner after which it is heated to expand its circumference and then is slid over the peripheral edge of glass 13'' and positioned in its groove. The wire 26, upon cooling, contracts and is securely held in its groove against displacement. The ring 15'' is then forced over the small arcuate portion of the ring 26 to the position shown in Figure 8. By this means the digit indicator which is, for example, a glass or plastic material, is rotatably mounted around the edge of the glass 13'' by means of wire 26 with the consequent advantage that the digit indicator is adapted to slide smoothly therearound. It is well known for example, plastics and glass have a relatively high coefficient of friction which might easily cause the digit indicator to slide barely around the glass. This difficulty is completely overcome by the wire mount shown in Fig. 8.

In Fig. 9 there is shown another form of the invention wherein a glass 13$^a$ has a series of hair lines 14$^a$ extending diametrically thereacross. Along the edge of the glass and opposite the edge of each hair line is positioned a numeral as shown previously with the digit indicator 15$^a$.

This glass 13$^a$ is adapted to be rotatably mounted on the slider 12'''. For example, referring to Fig. 11, the mounting posts 18 may end in a projection 18$^a$ which is adapted to engage a corresponding groove in the inner surface of the glass 13$^a$. By this means the glass 13$^a$ may be mounted rotatably on the slider so that any of the numerals may be brought in turn to a rotating position, for example, as shown in Fig. 6. When the glass 13$^a$ is thus rotated a different hair line 14$^a$ is brought to the transverse position so that there is no change in the slide rule reading itself but only in the digit indicating reading. Accordingly, in this form of the invention the glass 13$^a$ replaces the combination of the glass 13 and the digit indicator 15 according to the previously described forms of the invention.

In Fig. 10 there is shown a further form of the invention in which a slider 12 is slidably mounted on a duplex slide rule 11$^b$. A reading glass 13ᵇ is mounted on either side of the slide rule, for example, by means of mounting posts 18ᵇ as in the previous forms of the invention. Likewise according to this form of the invention the glasses 13ᵇ may optionally be magnifying glasses to increase the accuracy of the slide rule readings. Positioned around one of the glasses 13ᵇ is a digit indicator as described in connection with any of the previous figures whereby a reading of the digit position may be obtained as previously described.

The operation and use of this invention is obvious from an examination of the figures, and is similar for all forms of the invention. The slide rule is used conventionally for multiplication, division or the like, and in conjunction therewith the digit indicator or counter is used to determine the position of the decimal point. Each time that a decimal is added or subtracted either by virtue of passing the index point on the slide rule, or by virtue of using a figure larger than 10 or smaller than 1 in the computations, the proper and appropriate turn is made on the digit indicator. Thus, after a series of algebraic steps on the slide rule, it is a simple matter to refer to the digit indicator to determine, from the number thereon, the number of figures before the decimal point (or alternatively the number of zeros after the decimal and before the first significant figure in the answer). With only a little practice, an operator can become so accustomed to the use of the digit indicator that its use becomes automatic and perfectly accurate, thereby avoiding all errors in the placing of the decimal point.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A digit indicator for a slide rule comprising a member mounted on a slide rule glass and having a series of numbers thereon, said member being rotatably slidable with respect to an indicating point whereby the member may be rotated to bring, in turn, various of the numbers in line with the indicating point.

2. A digit indicator for a slide rule comprising a ring mounted around a slide rule glass and having a series of numbers thereon, said member being rotatably slidable with respect to an indicating point whereby the members may be rotated to bring, in turn, various of the numbers in line with the indicating point.

3. A digit indicator for a slide rule comprising a ring mounted around a slide rule glass and having a series of consecutive numbers therearound, said ring being rotatable around the glass whereby various of the numbers can be rotated, in turn, to a position in line with a hair line on the slide rule glass.

4. In a slide rule having a slider thereon and a slide rule glass mounted on the slider, a digit indicator comprising a ring slidably mounted around said glass and having a series of consecutive numbers therearound, said ring being rotatable around the glass whereby various of the numbers can be rotated, in turn, to a position in line with a hair line on the slide rule glass.

5. In a slide rule having a slider thereon and a slide rule glass mounted on the slider, a digit indicator comprising a ring rotatably slidably mounted around said glass and having a flange extending under said glass, a series of consecutive numbers around said ring and positioned to be brought in line with a hair line on the glass by rotating the ring around the glass.

6. In a slide rule having a slider thereon and a slide rule glass mounted on the slider, a digit indicator comprising a member rotatably slidably mounted around said glass and having a flange extending around an edge of said glass, a series of consecutive numbers on said member, said numbers being positioned to be brought in line, in turn with an indicating mark on said slider.

7. In a slide rule having a slider thereon and a slide rule glass mounted on said slider, a wire ring mounted around the edge of said glass, a ring-like member mounted around said glass and positioned to slide on said metallic ring, a series of consecutive numbers on said ring-like member positioned to be rotated, in turn, in line with an indicating mark, and a notch on said ring-like member adjacent with each number to present to the sense of touch an indication of the position of each number.

8. In a slide rule having a slider thereon and a slide rule glass mounted on said slider, a wire ring mounted around the edge of said glass, a ring-like member mounted around said glass and positioned to slide on said metallic ring, a series of consecutive numbers on said ring-like member positioned to be rotated, in turn, in line with an indicating mark.

MICHAEL CHERNEY.

REFERENCES CITED

The following references are of record in the file of this patent:

UNITED STATES PATENTS

| Number | Name | Date |
|---|---|---|
| 1,395,214 | Warne | Oct. 25, 1921 |
| 1,781,055 | Dudley | Nov. 11, 1930 |
| 1,912,032 | Carlson | May 30, 1933 |

OTHER REFERENCES

Figure 4086 on page 313 of Keuffel & Esser Co.'s 1909 Catalogue, 33 edition, address 127 Fulton Street, New York, N. Y.